July 20, 1965   B. MURRAY   3,196,210
MORSE-TO-BINARY CODE TRANSLATOR
Original Filed Nov. 12, 1959   8 Sheets-Sheet 1

INVENTOR.
BRADLEY MURRAY
BY Roy C. Hopgood
ATTORNEY

July 20, 1965

B. MURRAY 3,196,210

MORSE-TO-BINARY CODE TRANSLATOR

Original Filed Nov. 12, 1959

INVENTOR.
BRADLEY MURRAY
BY
ATTORNEY

July 20, 1965   B. MURRAY   3,196,210
MORSE-TO-BINARY CODE TRANSLATOR
Original Filed Nov. 12, 1959   8 Sheets-Sheet 3

INVENTOR.
BRADLEY MURRAY
BY
Roy C. Hoggard
ATTORNEY

July 20, 1965 B. MURRAY 3,196,210
MORSE-TO-BINARY CODE TRANSLATOR
Original Filed Nov. 12, 1959 8 Sheets-Sheet 4

INVENTOR.
BRADLEY MURRAY
BY
ATTORNEY

July 20, 1965　　　　　　　B. MURRAY　　　　　　　3,196,210
MORSE-TO-BINARY CODE TRANSLATOR
Original Filed Nov. 12, 1959　　　　　　　　　　　　8 Sheets-Sheet 5

INVENTOR.
BRADLEY MURRAY
BY
ATTORNEY

INVENTOR.
BRADLEY MURRAY
BY
Roy C. Hopgood
ATTORNEY

July 20, 1965     B. MURRAY     3,196,210
MORSE-TO-BINARY CODE TRANSLATOR
Original Filed Nov. 12, 1959     8 Sheets-Sheet 7

INVENTOR.
BRADLEY MURRAY
BY
ATTORNEY

July 20, 1965      B. MURRAY      3,196,210

MORSE-TO-BINARY CODE TRANSLATOR

Original Filed Nov. 12, 1959      8 Sheets-Sheet 8

| PULSES | FLIP-FLOPS | | | | AND GATE "6" OPEN |
|---|---|---|---|---|---|
| | 1 | 2 | 3 | 4 | |
| 1 | 0→1 | 0 | 0 | 0 | * |
| 2 | 1→0 | 0→1 | 0 | 0 | |
| 3 | 0→1 | 1 | 0 | 0 | |
| 4 | 1→0 | 1→0 | 0→1 | 0 | |
| 5 | 0→1 | 0 | 1 | 0 | * |
| 6 | 1→0 | 0→1 | 1 | 0 | |
| 7 | 0→1 | 1 | 1 | 0 | |
| 8 | 1→0 | 1→0 | 1→0 | 0→1 | |
| 9 | 0→1 | 0 | 0 | 1 | |
| 10 | 1→0 | 0→1 | 0 | 1 | |
| 11 | 0→1 | 1 | 0 | 1 | |
| 12 | 1→0 | 1→0 | 0→1 | 1 | |
| 13 | 0→1 | 0 | 1 | 1 | |
| 14 | 1→0 | 0→1 | 1 | 1 | |
| 15 | 0→1 | 1 | 1 | 1 | |

*Fig. 11*

INVENTOR.
BRADLEY MURRAY
BY *[signature]*
ATTORNEY

United States Patent Office 3,196,210
Patented July 20, 1965

3,196,210
MORSE-TO-BINARY CODE TRANSLATOR
Bradley Murray, Georgetown Preparatory School,
Garrett Park, Md.
Original application Nov. 12, 1959, Ser. No. 852,547, now
Patent No. 3,038,030, dated June 5, 1962. Divided
and this application Nov. 30, 1961, Ser. No. 156,053
6 Claims. (Cl. 178—26)

This application is a divisional of my copending application Serial No. 852,547, filed November 12, 1959, now U.S. Patent No. 3,038,030, issued June 5, 1962, for Morse-To-Binary Code Translator.

This invention relates to a Morse code translator, and more particularly to code speed detection circuits for the Morse-to-binary code translator.

The invention described and claimed in the copending application is directed to the translator, per se, utilizing standard digital computer components. In this application novel code speed detection circuits are claimed which have particular utility with my code translator described in the copending application.

Accordingly, it is a primary object of this invention to provide, in combination, a translator for converting Morse-to-binary code, utilizing digital techniques and code speed detection circuits for maintaining the accuracy of the translator.

It is another object of the invention to provide code speed detection circuits having both fine and coarse control over the number of pulses generated for indicating dots and dashes.

In accordance with an aspect of the invention, there is provided, in combination, a Morse code to binary code converter comprising a pulse generator for generating "start" and "finish" pulses identifying, respectively, the beginning and end of a Morse character. A signal element counter is coupled to the generator and is adapted to produce a given number of pulses in response to "start" and "finish" pulses indicative of a "dot" and a different number of pulses in response to "start" and "finish" pulses indicative of a "dash." A code speed detection circuit is coupled to the output of the signal element counter for determining whether the number of pulses generated thereby correspond to the given number. If the generated pulses do not correspond to the given number, means are provided to increase or decrease the frequency of generated pulses until correspondence is achieved.

The above-mentioned and other features and objects of this invention and the manner of attaining them will become more apparent and the invention itself will be best understood by reference to the following description of an embodiment of the invention taken in conjunction with the accompanying drawing, wherein:

FIGURE 11 is a chart showing the condition of each flip-flop in the "space" counter of FIGURE 3A during the application of fifteen successive input pulses.

In order that the description of the invention may be clearly understood, a brief description of the "basic building blocks" of the decoder will first be given.

Figures 1A, 1B, 1C, 1D:
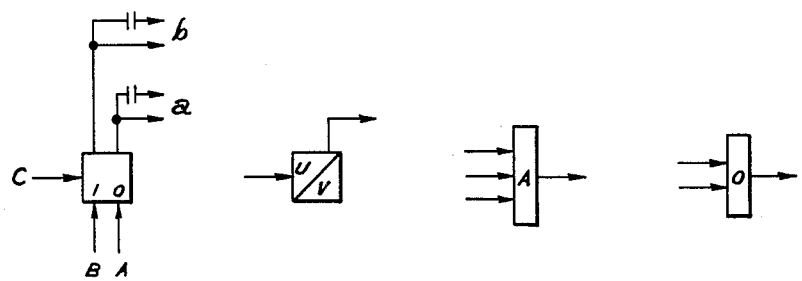
FIGURES 1A–1D and 2 are diagrammatic illustrations of logic blocks employed in the invention.

Referring now to FIG. 1, the four fundamental building blocks are diagrammatically illustrated, which diagrams shall be used throughout the other figures. These circuits are: the flip-flop (FIG. 1A), the univibrator (one-shot) or monostable trigger (FIG. 1B), the logic AND gate, and the logic OR gate.

The flip-flop (FIG. 1A) has three inputs: the reset input (A), which resets the flip-flop to the off, or 0, state; the set input (B), which sets the flip-flop to the on, or 1, state; and the complementary (binary) input (C), which causes the flip-flop to change state on successive pulses. There are four outputs, two of which produce steady-state signals, and two of which produce pulses, as indicated by the capacitors. The two outputs marked "$a$" are the 0 outputs, producing respectively an output pulse when the flip-flop changes from 1 to 0, and a steady-state, gate-enabling signal when the flip-flop is in the 0 state. The opposite obtains for the leads marked "$b$".

The univibrator (FIG. 1B), represented by a square marked U–V, has a single input and single output. It is used for pulse-delay purposes.

The AND and OR gates (FIGS. 1C, 1D) are represented by rectangles of any convenient size, with inputs represented by in-going arrows, outputs by out-going arrows. No distinction is made between active and passive gates, since such a distinction has no bearing on the general circuit description.

Morse-to-pulse converter

Figure 2:
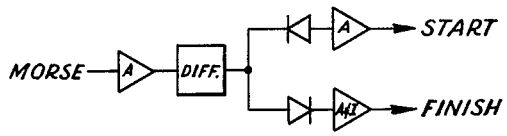

The first stage of the decoder converts the Morse signal into groups of pulses suitable for the counting circuits to follow. In order to define more sharply the start and finish of any Morse character, the characters are made to generate "start" and "finish" pulses by the circuit of FIGURE 2. The Morse characters are fed into an amplifier biased to cutoff (or, if advisable, into an amplifier operating at saturation). The output of the amplifier is differentiated by a standard R-C circuit, so that the start of a Morse character will generate negative-going signals, and the end of a character positive-going signals, or vice versa. The negative pulses are amplified, and the positive pulses are amplified and inverted for use in the decoding circuits. The diodes separate the two kinds of pulses.

The Morse characters are converted into pulses by using the "start" and "finish" pulses to gate an oscillator or pulse generator.

If the code characters are used to gate a generator, the number of pulses generated for a long and short will be in the ratio of 3:1, since this is the time-duration ratio of the ideal Morse code. A 3:1 pulse ratio would, however, introduce complexity in the second stage, where the pulses are converted into a binary code. For minimum complexity, therefore, the pulses are generated having a 2:1 ratio.

*The "line" or signal element counter.*—The term "line" is used to designate the presence of a Morse character; the term "space" to designate its absence, as in the spaces between characters of a letter, between letters, and between words.

Figure 3A:
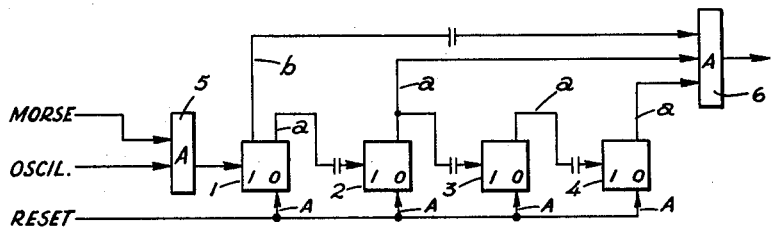
FIGURES 3A and 3B are schematic diagrams of two forms of a "line" counter.
Figure 3B:
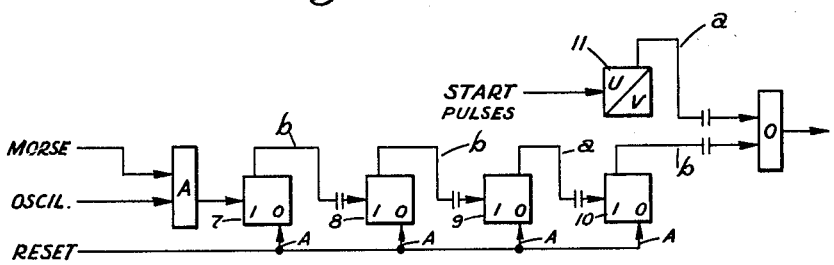

FIGURES 3A and 3B show two counters designed to give a single output pulse for a dot, and two output pulses for a dash. Each counter allows the Morse character to deviate from the ideal length of a dot or dash.

In FIGURE 3A, four flip-flops 1, 2, 3 and 4 are connected in a conventional binary counter. An input AND gate 5 is conditioned by the Morse characters (i.e., by the start and finish pulses described above). An oscillator is adjusted to a frequency or pulse repetition rate such that the dot of ideal length will gate three pulses into the counter, and a dash of ideal length nine pulses. The output from flip-flop 1 is connected over a "b"-lead to an AND circuit 6 having three input leads; an output pulse, therefore, is applied to the gate on input pulses 1, 3, 5, 7, 9, 11, 13, 15. In FIGURE 11 the applied pulses and their effect on the flip-flops are charted for ease in following the sequence of operation.

In the illustrated embodiment, the AND gate 6 is also controlled by the outputs from flip-flops 2 and 4. The second flip-flop permits pulses to pass only when it is in its 0 state—it conditions the gate for pulses 1, 5, 9, and 13. The fourth flip-flop permits pulses to pass only when it is in its 0 state—it conditions the gate for pulses 1 through 7. When these three flip-flops are combined, only the 1st and 5th pulses can pass.

Since the first input pulse of the group of three generated by a dot produces an output pulse, a dot can be about 33 percent shorter than the ideal. It is recalled that a dot is indicated by one pulse. And, since a second output pulse is not generated until the 5th input pulse, the dot can be about 33 percent longer than the ideal. The ideal dash will generate 9 input pulses. In this counter, the dash can be short enough to produce only 5 (giving the second output pulse, indicating a dash is being received), and long enough to generate 15 input pulses (beyond 15 the cycle is repeated, and 3 output pulses would be generated, causing error).

The clearing or resetting of the counter does not produce a false output pulse, for there can be no output unless the first flip-flop 1 changes from "0" to "1." If the first flip-flop is in the 0 state when the reset pulse is applied, it does not change state, and no pulse will appear across the capacitor. And, if it is in the 1 state, the reset pulse changes it to 0.

The counter of FIGURE 3B is an improved embodiment especially as to allowable deviation from the ideal code. The four flip-flops 7, 8, 9 and 10 of this counter are interconnected differently from the counter of FIGURE 3A. The connections as indicated make the counter a scale-of-five, that is, the fifth input pulse produces an output pulse. The method of obtaining various scaling ratios is known and is described in an article entitled "A Variable Binary Scaler," I.R.E. Transactions on Electronic Computers, vol. EC-4, No. 2 (June 1955), pp. 70–74, written by Bradley Murray. This counter is different from the counter of FIGURE 3A in two important respects: the inclusion of univibrator 11 and the binary flip-flop stage 10.

The univibrator 11 is employed to delay the "start" pulse, since this start pulse is also used to clear certain sections of a second part of the decoder. The delay time of the univibrator should be adjusted to about the same duration as the time between pulses of the oscillator when it is operating at its maximum frequency. The reason for this is explained below.

The purpose of the fourth binary stage 10 is clear from an examination of the operating sequence of the scale-of-five counter: 0000, 1110, 0110, 1010, 0010, 1101, 0101, 1001, 0001, 1111, 0111, 1011, 0011, 1100, 0100, 1000, 0000. An output pulse is generated on the "a" lead of the third flip-flop 9 when it changes from state 1 to state 0. This change takes place on the 5th and 9th input pulses. Thus, if the duration of a dash were even slightly greater than the ideal, three output pulses, instead of two, would be generated by the "line" counter through the OR circuit indicated: one by the "start" pulse, and two by the scale-of-five counter. By taking the output from the "b" lead of flip-flop 10, however, an output pulse is obtained from the OR circuit only on the 1st, 5th and 21st input pulses—that is, the delayed "start" pulse, and when the fourth flip-flop 10 changes state from 0 to 1. This means that, practically speaking, there is no upper limit on the deviation of a dash from the ideal. The lower limit is the same as for the first counter described. The lower limit of a dot is practically unlimited, since it need be long enough only to generate a short pulse, which, in current computer design, is less than a microsecond. The upper limit of a dot is the same as for the first circuit described.

*The "space" counter.*—It is necessary to distinguish between three different kinds of spaces: the short space, equal in duration to one dot, and used to indicate the space between characters of a letter; the longer space, equal in duration to three dots, or a dash, and used to indicate the space between letters; and the long space, equal in duration to six dots or two dashes, and used to indicate the space between words.

Figure 4A:
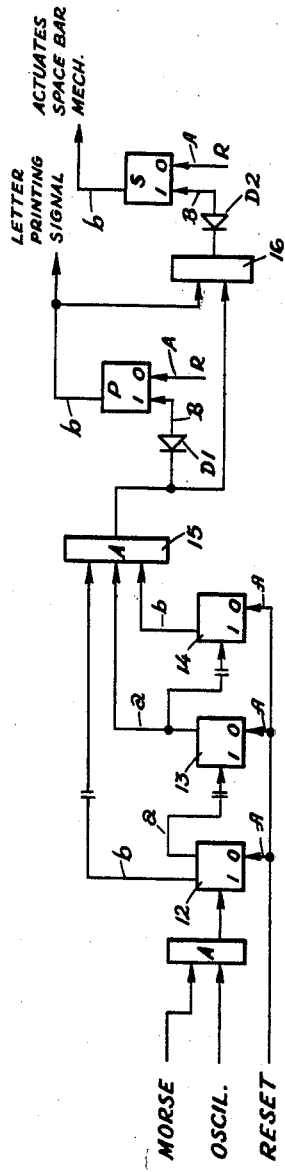
FIGURES 4A and 4B are schematic diagrams of two forms of "space" counter.
Figure 4B:
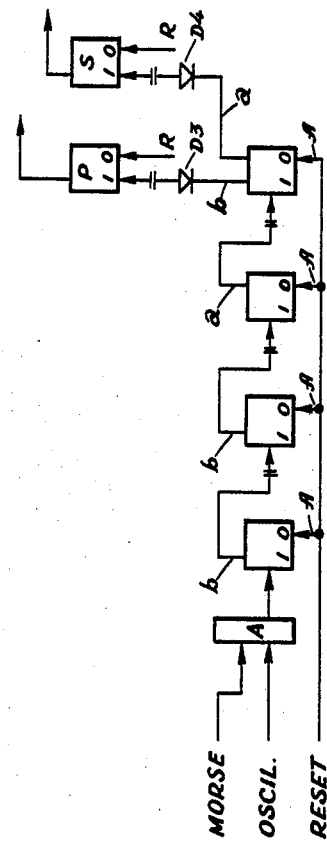

The two counters for distinguishing spaces are shown in FIGURES 4A and 4B. These counters are basically the same as those used for the "line" counter. In FIGURE 4A, the pulses from first flip-flop 12 are gated by the second and third flip-flops 13, 14, so connected that only the 5th and 13th input pulses generate effective output pulses. A pulse generated by a short space is not required, since a "finish" pulse can supply its functions. The ideal-length letter space will gate 9 input pulses to the counter, and the 5th of these produces an output pulse. The ideal-length word space will gate in 18 pulses, and the 13th of these produces the second output pulse. When the first output pulse is passed by the AND circuit 15, it sets the "print" flip-flop P to its 1 state. This flip-flop has a number of functions besides producing a letter-printing signal. The only one to be noted here is that it conditions an AND gate 16. The first output pulse cannot pass through this gate, since the "print" flip-flop P is initially in its 0 state, before the arrival of the first pulse. That is, the pulse applied directly to the AND gate 16 is terminated before the output from P is applied to the gate 16. Where pulses are of relatively long duration, it would be necessary to insert some kind of delay unit, of about one-pulse duration, in the lower input lead to the AND gate 16.

The second output pulse, indicating a long wordspace space, has no effect on the flip-flop P (since it is already in the 1 state from the previous pulse), but is passed to the "space" flip-flop S through the AND circuit 16, thereby changing the flip-flop S to the 1 state. Subsequent pulses will have no effect on either of these flip-flops, until they are reset. The "space" flip-flop S is used to actuate the space-bar mechanism on the typewriter or printer. Both of these flip-flops are reset (on the lead marked "R") by the same reset pulse. This is possible because many typewriters will insert a space after a letter, even if the space-bar is depressed while the letter key is held down.

In FIGURE 4B the same kind of scaler is employed as in FIGURE 3B. Actually this is a scale-of-five or a scale-of-thirteen, depending upon which output lead of the fourth flip-flop is used. The "b" lead generates an output pulse on the 5th input pulse, and the "a" lead generates one on the 13th. The "b" lead sets the "print" flip-flop P, and the "a" lead sets the "space" flip-flop S.

When the set and reset inputs of a flip-flop are used, they can usually be reset by a pulse of the wrong polarity on the set input; and set by a wrong pulse on the reset input. This cannot happen in the circuit of FIGURE 4A, if the AND gates 15, 16 pass pulses of only the correct (negative) polarity; and, therefore, diodes $D_1$ and $D_2$ in the FIGURE 4A would be superfluous. Diodes $D_3$ and $D_4$, however, are needed in the circuit of FIGURE 4B.

Figure 5:
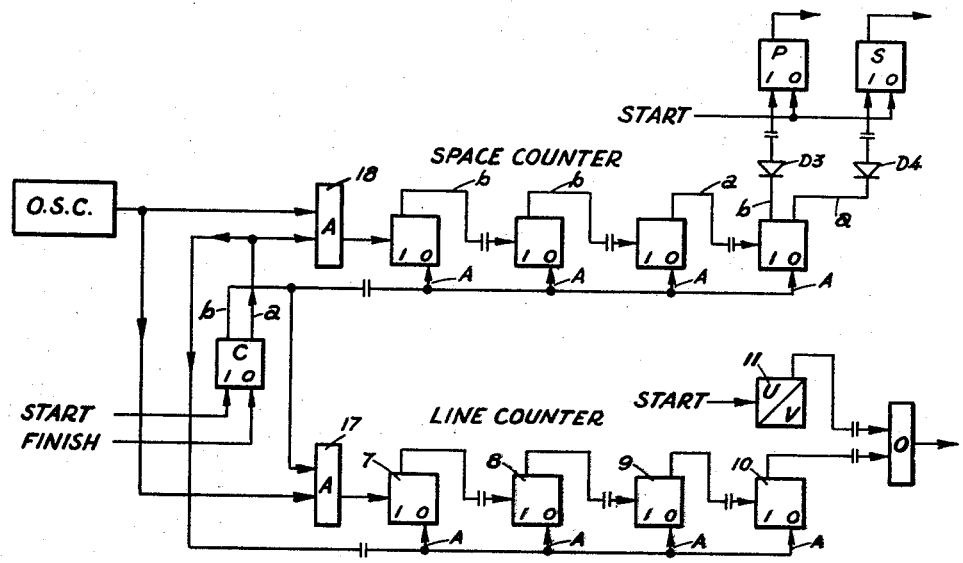
FIG. 5 is a schematic diagram of a Morse-to-pulse counter.

*Combined Morse-to-pulse converter.*—FIGURE 5 combines the "line" and "space" counters of FIGURES 3B and 4B just described. The following is a description of the operating sequence:

When a Morse character is received, a "start" pulse is generated. This pulse sets a pulse generator capable of producing a pulse of variable duration, e.g., control flip-flop C to 1, resets P and S to 0; and generates an output pulse in the "line" counter through U–V 11. As C changes state from 0 to 1, it generates a pulse on the "b" lead to reset the "space" counter, and, at the same time, generates a steady-state signal to condition the input gate 17 to the "line" counter. If the character being received is a dot, no pulse is generated from the flip-flops of the line counter, and, therefore, only a single pulse (the output from U–V) is passed to the next stage. If the character is a dash, an additional pulse is generated, and two pulses pass to the next stage. At the completion of the Morse character, a finish pulse is generated, which resets C from 1 to 0. This generates a pulse which clears the "line" counter over line "a", and a steady-state signal which conditions the input gate 18 to the "space" counter. If the space is short (one dot) there is no output from the "space" counter. If it is longer (one dash) or long (two dashes) one or two pulses are generated to set either P, or P and S, as described above. The next Morse character repeats this cycle.

*Pulse-to-binary converter*

The second stage of the decoder converts the pulses and pulse pairs of the first stage into a binary code. Obviously it is not enough simply to count these pulses, since the number of pulses generated by different letters may be the same. Consider, for instance, D (dash-dot-dot), R (dot-dash-dot), and U (dot-dot-dash). Each of these letters consists of one dash and two dots—a total of four pulses.

Figure 6:
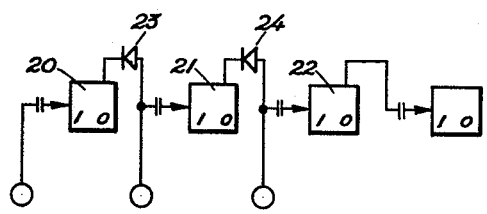
FIGURE 6 is a simplified diagram of a sequence determining circuit used in the Morse-to-binary converter.

FIGURE 6 shows a simplified arrangement by which the order of appearance of the dots and dashes can be distinguished. The first Morse character of a letter is fed to the input of the first flip-flop 20, the second to the second flip-flop 21, the third to the third flip-flop 22. The diodes 23, 24 prevent the input pulses to the second and third flip-flops from effecting the preceding stage.

In the case of the letter D, two pulses (dash) are fed into the first flip-flop, one pulse (dot) into the second, and one pulse (dot) into the third. The state of the counter after each Morse character will be: 0100, 0010, 0001, the final state being the binary representation of decimal 8. The sequence of operation for the letter R is: 1000, 1010, 1001, the final state being the binary equivalent of decimal 9. The sequence for U is 1000, 1100, 1101, the final state being decimal 11.

Extending the counter to six stages, there will be a unique binary equivalent for every letter, numeral, and punctuation mark, as shown in the following table.

Morse characters to be decoded (except for punctuation marks). The maximum number of characters in a letter is 4. Of the 4-groups there are four possible codes not used dash-dash-dash-dot (22), the dot-dash-dot-dash (25), dot-dot-dash-dash (27), and dash-dash-dash-dash (30). These could well be used for special symbols and instructions. Among the five-and six charater codes (numerals and punctuation), there are many not used, but these lack the brevity of the ones mentioned.

For numerals, the Morse code uses a five-character code; and, therefore, six binary stages are needed. For punctuation, which uses a six-character code, an exception is made to the general rule. The sixth Morse character, instead of being fed into the sixth stage, is fed back into the first stage, and the resulting binary code is still different from that of any other letter or numeral.

Figure 7:
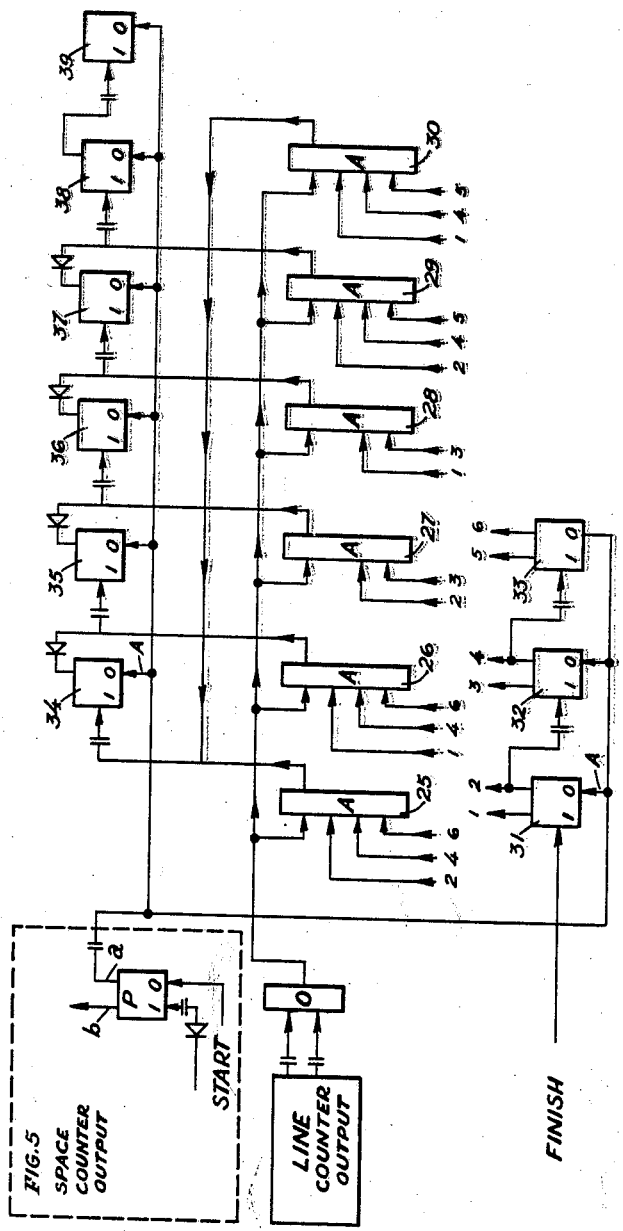
FIGURE 7 is a schematic diagram of the second stage of the Morse-to-binary code converter.

FIGURE 7 shows a practical circuit for this pulse-to-binary counter. The OR output gate of the line counter of FIGURE 5 has been redrawn as indicated. The output pulses from the OR gate are fed simultaneously to six AND gates 25, 26, 27, 28, 29 and 30. These gates are controlled by a three-stage binary counter 31, 32, 33. When the three-stage counter is at 000, the first AND gate 25 is enabled; when it is at 100, the second gate 26 is enabled, and so forth. (The numbers on the AND gate input leads correspond to those on the steady-state output leads of the three-stage counter.) In this way, the output pulses from the "line" counter are fed to the proper leads for input to a six-stage binary counter 34, 35, 36, 37, 38 and 39 shown at the top of the figure. Note that the output from the sixth AND gate 30 is fed to the input of the first stage 34 of the counter.

The sequence of operation is as follows. When the "print" flip-flop, P, from the previous stage (FIGURE 5) is reset by a "start" pulse, it generates a pulse which resets both the three-stage and the six-stage counters. The "start" pulse itself cannot be used for this clearing function, or it would reset the counters after each Morse character, instead of after each completed letter, as required. The P flip-flop, however, is not reset until the first "start" pulse after a completed letter.

When the first Morse character of a letter is received, it generates one or two pulses from the "line" counter, depending upon whether it is a dot or a dash. Since the three-stage binary counter has been reset to 000, only the first stage 25 of the six-stage binary counter is responsive to this pulse or pair of pulses. When the character ends, a "finish" pulse is generated, which advances the three-stage counter to the next binary number, 100, thereby conditioning the second AND gate 26, and per-

| Morse | Binary | Dec. | Morse | Binary | Dec. |
|---|---|---|---|---|---|
| E .     | 100000 | 1  | Free . — . —   | 100110 | 25 |
| T —     | 010000 | 2  | Q — — . —      | 010110 | 26 |
| I . .   | 110000 | 3  | Free . — — .   | 110110 | 27 |
| N — .   | 001000 | 4  | Y — . — —      | 001110 | 28 |
| A . —   | 101000 | 5  | J . — — —      | 101110 | 29 |
| M — —   | 011000 | 6  | Free — — — .   | 011110 | 30 |
| S . . . | 111000 | 7  | 5 . . . . .    | 111110 | 31 |
| D — . . | 000100 | 8  | 6 — . . . .    | 000001 | 32 |
| R . — . | 100100 | 9  | 7 — — . . .    | 010001 | 34 |
| G — — . | 010100 | 10 | 8 — — — . .    | 011001 | 38 |
| U . . — | 110100 | 11 | 9 — — — — .    | 011101 | 46 |
| K — . — | 001100 | 12 | 4 . . . . —    | 111101 | 47 |
| W . — — | 101100 | 13 | 3 . . . — —    | 111011 | 55 |
| O — — — | 011100 | 14 | 2 . . — — —    | 110111 | 59 |
| H . . . .| 111100 | 15 | 1 . — — — —    | 101111 | 61 |
| B — . . .| 000010 | 16 | 0 — — — — —    | 011111 | 62 |
| L . — . .| 100010 | 17 | Colon — — — . . . | 111001 | 39 |
| Z — — . .| 010010 | 18 | Trans. Ended . . . — . — | 100101 | 41 |
| F . . — .| 110010 | 19 | Period . — . — . — | 010101 | 42 |
| C — . — .| 001010 | 20 | ? . . — — . .  | 001100 | 44 |
| P . — — .| 101010 | 21 | Comma — — . . — — | 001011 | 52 |
| Free . — — — | 011010 | 22 | Semi-Colon — . — . — . | 101011 | 53 |
| V . . . —| 111010 | 23 | Dash — . . . . — | 000011 | 48 |
| X — . . —| 000110 | 24 | Quote . — . . — . | 010011 | 50 |

As a general rule, the number of stages required in this type of counter will be one more than the number of mitting the next pulse or pair of pulses to be fed directly into the second stage 35 of the six-stage counter. This cycle is repeated until the "space" counter of FIGURE 5 detects a long space (whether it is a letter-space or a word-space). Flip-flop P is then changed from 0 to 1. The next start pulse resets P, clears both counters, and the process is repeated for the next group of characters.

It was mentioned above in connection with the univibrator of FIGURES 3 and 5, that the delay time should be adjusted to about the same duration as the time between pulses of the oscillator when it is operating at its maximum frequency. The reason for this can be understood from FIGURE 7 and the preceding description of its operating cycle. If there is no delay time, the "start" pulse which indicates a dot would be fed to the circuits of FIGURE 7 before the same "start" pulse had time to clear them. On the other hand, this delay cannot be too long, for the three-stage counter 31–33 of FIGURE 7 is advanced by each "finish" pulse, and, if the duration of a dot were very short, the "finish" pulse might advance the three-stage counter before the arrival of the dot pulse, thereby causing the dot pulse to be fed into the wrong stage.

*Partial memory*

The operating time of the decoder is limited only by the computer components, and these have been designed to operate at speeds well over a megacycle. Therefore, the only practical limitation on receiving speed is imposed by the printing mechanism. In the decoder, as described thus far, the time allowed for printing extends from the 5th pulse gated into the "space" counter to the "start" pulse of the following Morse character. If the spaces are of ideal duration (gating 9 pulses for a letter-space and 18 for a word-space), this would be equivalent to a printing time of about one and one-third dots for a letter-space—and it is this shorter letter-space which determines the maximum receiving speed. If the spacing is not of ideal duration, the printing time can be as short as one-third of a dot.

To overcome this speed limitation—that is, to increase the printing time by distributing it among the letters with more than two characters, standard memory circuits can be incorporated in the decoder. These memories would be "written" into at the conclusion of each letter, and read out at periodic intervals, corresponding to the speed at which the code is being received. Such memories give the printing mechanism time to catch up, while letters of more characters are being decoded. These memories, however, are not part of the invention and, therefore, are not described in detail.

With a slight change in circuitry it is possible to incorporate a "partial" memory, which gives an increase in the printing time, and, therefore, a corresponding increase in the speed capability of the decoder. This memory has been designed around the shortest of the Morse letters, E, which consists of a single dot. The worst possible case, the shortest printing time for a letter, is had when the letter E is followed by another E. However, by terminating the printing time with the "finish" pulse of the E, instead of with the "start" pulse the printing time can be extended for the duration of the E—one dot, for an ideal code.

Figure 8:
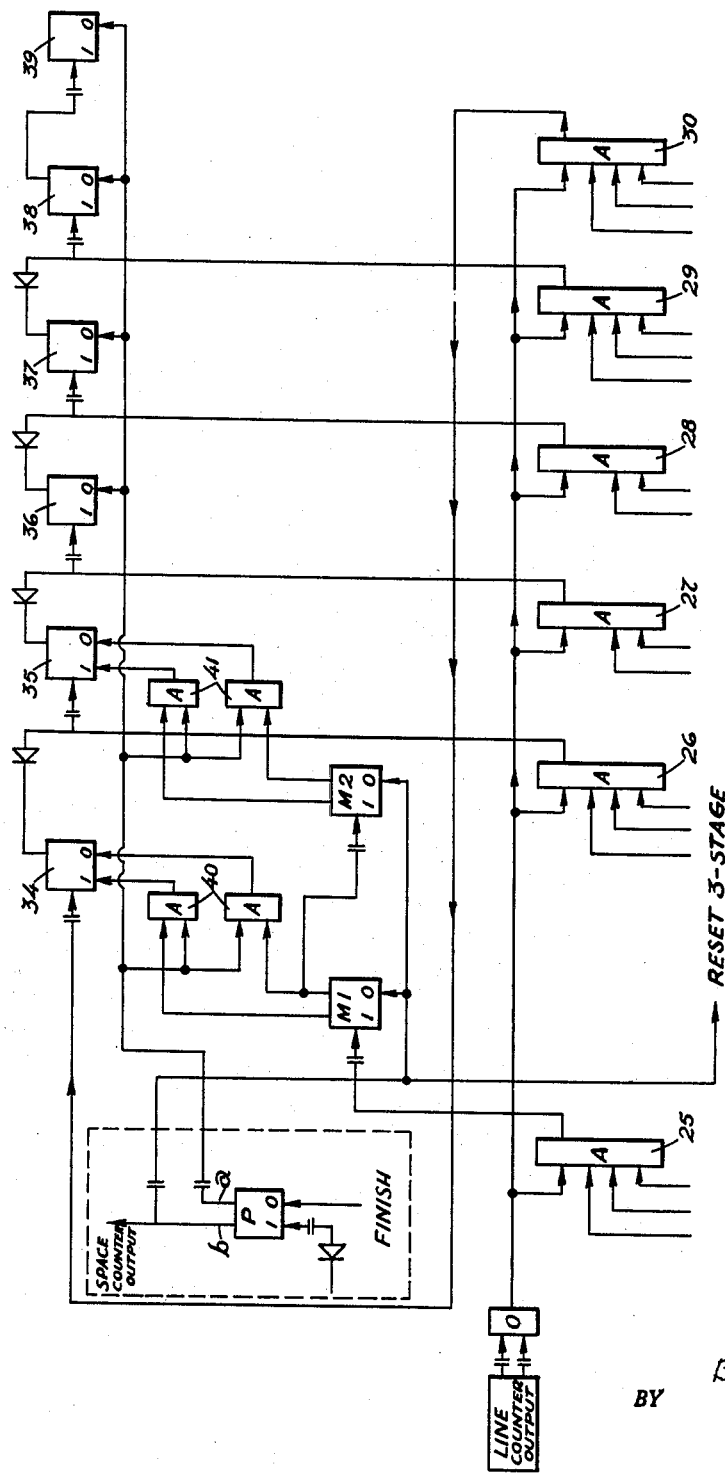
FIGURE 8 is a schematic diagram similar to FIGURE 7 and including memory circuits for providing a partial memory of the binary code.

FIGURE 8 shows the circuit of this partial memory. It is basically the same as FIGURE 7, except for the addition of M1 and M2, the partial memory flip-flops. These two flip-flops control the resetting of the first two stages 34, 35 of the six-stage binary counter; and this counter is reset on a "finish" pulse to P, rather than on a "start" pulse as in FIGURE 7.

The operating cycle is as follows. The pulse or pulse pair (dot or dash pulses) are fed from the "line" counter over AND gate 25 to the memory pair, M1–M2—setting this pair to either 10 for a single-pulse dot, or 01 for a double-pulse dash. At the termination of the first Morse character, a "finish" pulse is generated. This pulse advances the three-stage counter (not shown) just as it did in FIGURE 7. It also resets P from 1 to 0. As P resets, it generates a pulse on its "a" lead, which is fed directly to the stages 36, 37, 38 and 39, of the counter, resetting them. The same resetting pulse is fed to the two pairs of AND gates 40, 41 controlled by the M1–M2 pair. Thus, the first two stages of the six-stage counter are reset to the same state (10, or 01) as the partial memory pair. The second, third, etc. Morse characters are fed to the stages 35, 36, etc. as they were in FIGURE 7. The sixth Morse character (punctuation), however, is not fed to the partial memory input, as was the first character, but back into the first stage of the six-stage counter.

At the end of a completed letter, the fifth pulse into the space counter generates the pulse that sets P from 0 to 1. In so changing, P generates a pulse on its "b" lead, which resets both the partial memory pair, and the three-stage binary counter, preparing them for reception of the first Morse character of the next letter. Both the memory pair and the three-stage counter can be reset at this time, since they are not needed for the printing operation which begins as P changes from 0 to 1.

*Code speed detection*

As mentioned previously, the invention claimed in this application is directed to code speed detection.

The determination of code speeds, and the consequent adjustment of the oscillator frequency is also designed around digital components. It is, however, partially adaptable to analogue techniques.

Adjustment of the oscillator is divided into two functions: fine frequency adjustment and coarse frequency adjustment.

*Fine frequency adjustment.*—A dash is used as the standard of measurement, since there is no difficulty about the shortness of a dot—the "start" pulse is sufficient to indicate its presence. Presuming the coarse frequency has been so adjusted that a dash will generate 5 to 12 pulses in the "line" counter, the oscillator is regulated so that nine (the ideal number) pulses are generated in the counter. The detector uses a "finish" pulse to read the condition of the line counter, and to make the required correction. There follows a chart of the operating sequence of the "line" counter, which, it will be remembered, is a scale-of-five counter:

| Coarse Frequency Increase | | | Fine Frequency Control | | | Coarse Frequency Decrease | | |
|---|---|---|---|---|---|---|---|---|
| 0___ | 00000 | Inc. x3 | 5___ | 11010 | 0 | 13__ | 11001 | Dec. x2 |
| 1___ | 11100 | 0 | 6___ | 01010 | Inc. 1 | 14__ | 01001 | Dec. x2 |
| 2___ | 01100 | 0 | 7 | 10010 | Inc. 1 | 15__ | 10001 | x2 |
| 3___ | 10100 | 0 | 8___ | 00010 | Inc. 1 | 16__ | 00001 | x2 |
|  |  |  |  |  |  | 17__ | 11101 | x3 |
| 4___ | 00100 | 0 | 9___ | 11110 | 0 | 18__ | 01101 | x3 |
|  |  |  |  |  |  | 19__ | 10101 | x3 |
|  |  |  | 10__ | 01110 | Dec. 1 | 20__ | 00101 | x3 |
|  |  |  |  |  |  | 21__ | 11011 | x3 |
|  |  |  | 11__ | 10110 | Dec. 1 | 22__ | 01011 | x3 |
|  |  |  |  |  |  | 23__ | 10011 | x3 |
|  |  |  | 12__ | 00110 | Dec. 1 | 24__ | 00011 | x3 |
|  |  |  |  |  |  | 25__ | 11111 | x3 |
|  |  |  |  |  |  | 26__ | 01111 | x3 |
|  |  |  |  |  |  | 27 | 10111 | x3 |
|  |  |  |  |  |  | 28__ | 00111 | x3 |

The center column of the chart deals with the pulses (5–12) which concern fine frequency control. First is listed the pulse number, then the condition of the "line" counter after the pulse is received, and finally the correction that is to be made. It should be noted that for pulse 5, no change is made. This is because the fifth pulse might be generated by a dot that is too long. If it is actually a dash generating only five pulses, then the condition will be corected by the coarse frequency control. All the other corrections consist in varying the frequency of the oscillator to give only one more (or less) pulse for the same length code character. Thus, all changes in the fine frequency control are made gradually; and a single character which is too long or too short will not cause a large deviation from the average length.

Figure 9:
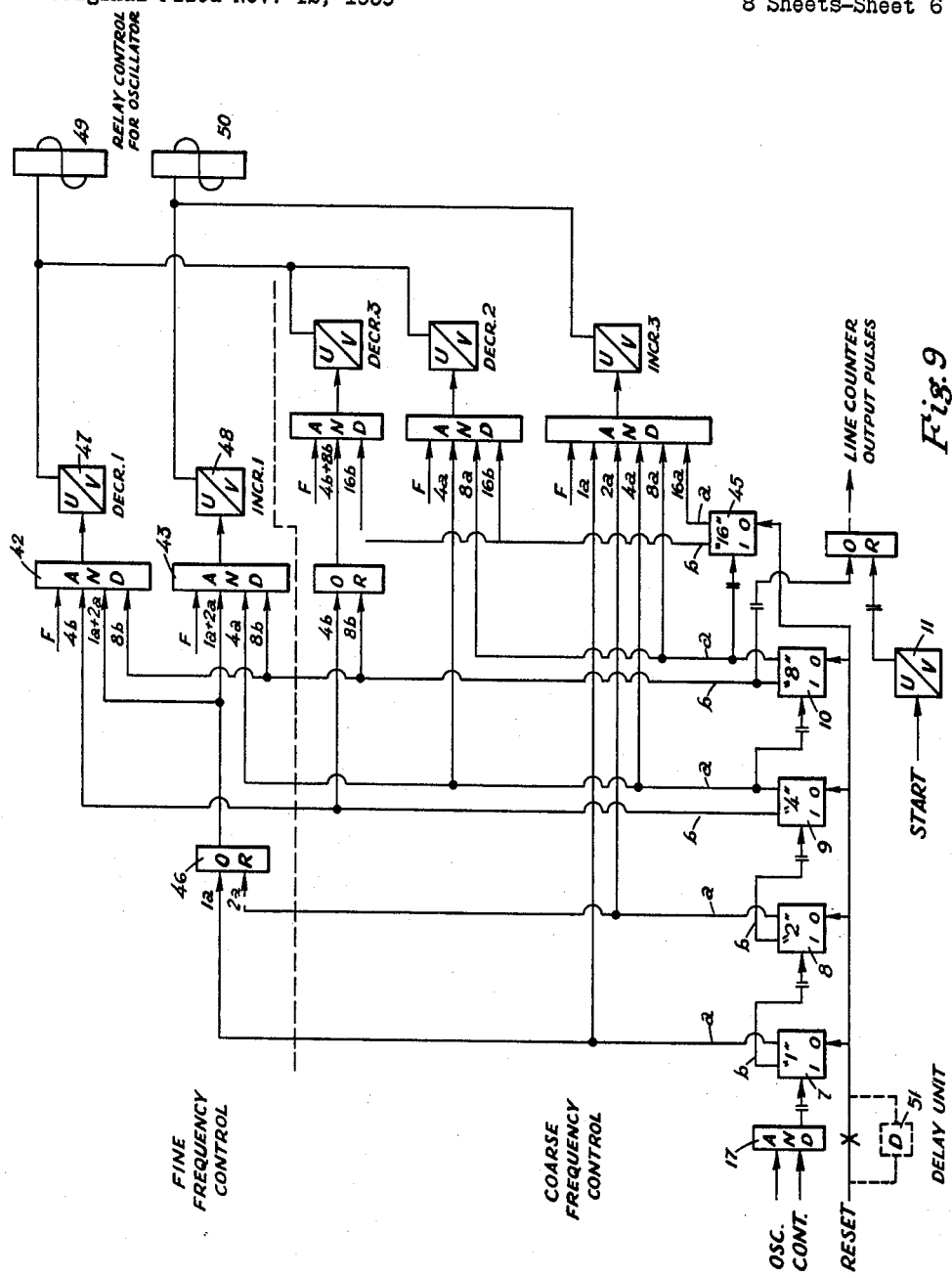
FIGURE 9 is a schematic diagram of a code speed detection circuit.

The upper part of FIGURE 9 (above the dotted line) shows the circuits which fulfill the requirements for fine frequency control. The flip-flops at the bottom 7, 8, 9 and 10 for the binary notations "1", "2", "4" and "8" are the same ones as shown in the line counter of FIGURES 3 and 5; and the univibrator 11 of FIGURE 5 is shown at the bottom of FIGURE 9. An additional flip-flop 45 for the binary "16" has been added for purposes of coarse frequency control. According to the chart, an increase of 1 pulse is required for the condition when flip-flop 10 is "on" (output on 8b), flip-flop 9 is "off" (4a), and either flip-flop 7 or flip-flop 8, or both, are "off" (1a+2a). Under these conditions, a "finish" pulse F will pass through the gate 43:

Incr. $1 = (F)(1a+2a)(4a)(8b)$

The conditions for a decrease of 1 pulse are met by:

Decr. $1 = (F)(1a+2a)(4b)(8b)$

If it should be desired to make a correction when the "line" counter reads 5, then the line from the OR gate 46 (1a+2a) should be disconnected from the "Increase 1" circuit 48.

After a finish pulse passes through one of these two gates 42, 43, it energizes a univibrator 47 or 48 in the output of which is, for example, a stepping relay 49 or 50, connected to a potentiometer (not shown). The potentiometer controls the frequency of the oscillator. The univibrator is adjusted to change the frequency by approximately one pulse. This adjustment will vary, of course, according to the setting of the coarse frequency control. If a given change of resistance causes a certain change in frequency when the oscillator operates at 50 p.p.s., the same change in resistance will cause a different change in frequency when the oscillator operates at 300 p.p.s. Because of the relatively narrow frequency range of the oscillator in this application, these differences should not be important.

The coils of stepping relays 49, 50 are shown in FIGURE 9. For increasing and decreasing, the steppers could feed into a computing differential gear, and the output of the gear into a potentiometer shaft. Or, the coils could actuate $dp/dt$ relays which change the polarity of a small D.C. motor, as used to drive potentiometers in analogue circuits.

Since the "finish" pulse reads the state of the line counter, it is important that this counter is not cleared before the "finish" pulse can read it. Resetting of the line counter is accomplished (FIGURE 5) indirectly by the finish pulse, through control flip-flop C. If the finish pulse is short, compared to the switching time of the control flip-flop, no difficulty will be encountered. If it is not, there is need for a delay 51 in the reset lead of the line counter as suggested by dotted lines, equal to a bit less than one pulse, when the oscillator is operating at its maximum frequency.

Some measure of control can be exercised over the "space" counter by including a similar fine frequency control. The coarse frequency control of the "space" counter would be handled by the coarse frequency control of the "line" counter. If this is done, a separate oscillator would be used for the "space" counter.

*Coarse frequency control.*—This is accomplished by double, tripling, etc. the oscillator frequency, according to the requirements of the above chart. The only increase (tripling, as indicated by $x3$) is made when the "line" counter shows all flip-flops in the 0-state. All other circuit conditions are indicated on the output leads to the various gates of FIGURE 9. The univibrators are adjusted to stay "on" for correspondingly longer periods, allowing a motor or self-stepping relay to accomplish the required changes. Where the code is being received very rapidly, the full change may not be accomplished before the next series of pulses comes into the "line" counter, but this is of no consequence.

Figure 10:
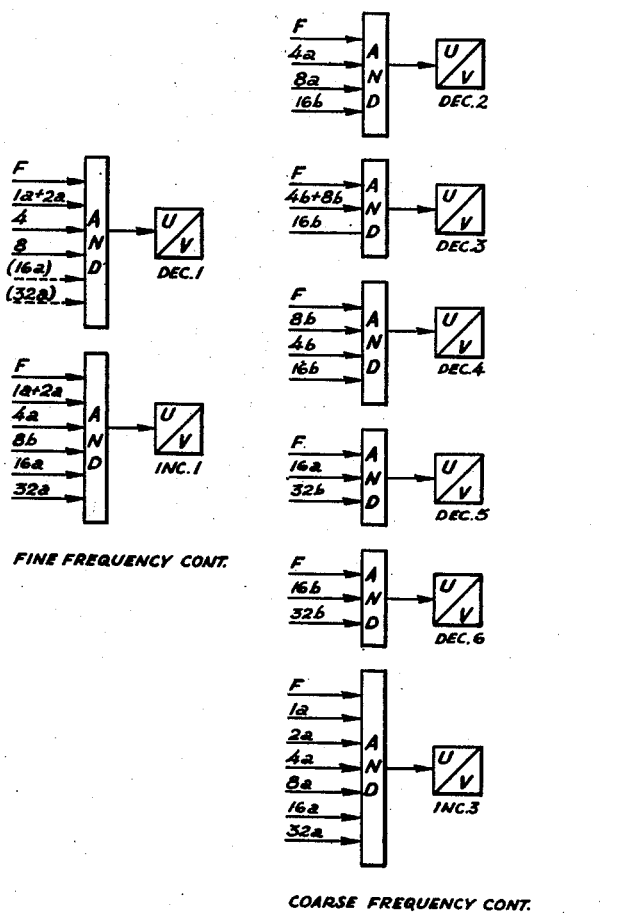
FIGURE 10 is similar to FIGURE 9, including circuitry for increasing the range of speed detection.

The circuits of FIGURE 9 give a fairly limited range of receiving speeds (about 3-to-1). They are shown mainly for purposes of illustrations. In order to increase the range, additional flip-flops and gates are added. FIGURE 10 illustrates this. With the addition of one more flip-flop, for the binary notation "32," the range can be increased to about 7-to-1. The complementary output of each additional flip-flop must be added to the gate to "Increase $x3$", since this is done only when the entire counter is at 0.

It is not necessary to make similar provisions for the gates to "Decrease 2," "Decrease 3," etc., because all of these univibrators are parallel supplies for the relay coils; and, in the case of overlapping (i.e., when two are turned "on" at the same time) the one with the longer period will prevail.

*Variation.*—A method more closely allied to analogue methods can be used for the coarse frequency control. Instead of reading the "line" counter, a separate counter may be added to the decoder (and this counter may be straight binary code). Pulses to the "line" counter are also fed to this coarse frequency control counter. The motor which operates the resistance (potentiometer) in the oscillator also operates an analogue-to-digital converter. The motor is energized during the spaces between code characters; and the analogue-to-digital converter is so wired that it "seeks" the binary code for 9 pulses— that is, the motor is not energized when the counter reads 9. Like the coarse frequency control just described, the motor increases the frequency only for the condition when all flip-flops of the counter read 0. If the fine frequency control described above is included, the motor would also be de-energized for pulses 1 through 12, with the fine frequency control taking over for pulses 5 through 12. If the fine frequency is not used, it is still necessary that the motor be de-energized for pulses 1, 2, 3 and 4, since these pertain to a dot; and the control of frequency is centered around the length of a dash.

Printing

No specific printer is designed for the novel decoder; and, consequently no network is included to convert the binary code to a specific letter on the printer. The network will depend on the printer used; and, in any event, it would consist of a standard diode network, or the equivalent.

With the advent of high-speed, dry-ink printers, there is no practical upper limit to receiving speeds. Where mechanical printers are used, certain requirements must be observed.

If a full memory is not used, there will be difficulty in shifting the carriage to a new line, since certain letters will be lost, during the process. Therefore, a printer with a tape (not requiring carriage return) would be required. If however, the sender is sending code specifically to this receiving device, one of the "spare" characters mentioned in the table could be sent to indicate carriage return. Two others could be used to indicate a shift to upper case and a return to lower case.

If the printer is of a type which does not insert a space, while a letter key is depressed, some modification must be made in flip-flop P and flip-flop S of FIGURES 4 and 5, so that P is reset before S. Example, S could be used to reset P.

While the foregoing description sets forth the principles of the invention in connection with specific apparatus, it is to be clearly understood that this description is made only by way of example and not as a limitation of the scope of the invention as set forth in the objects thereof and in the accompanying claims.

I claim:

1. In a Morse code-to-binary code converter,
   a first pulse generating means for generating start and finish pulses identifying respectively the beginning and end of a Morse signal element, a second pulse generating means having a predetermined pulse repetition rate of higher frequency than the frequency of said start and finish pulses, gating means coupled to the output of said first and second generating means for passing pulses from said second generating means during the period between said start and finish pulses, whereby said gating means passes a given number of pulses indicative of a dot and a different given number of pulses indicative of a dash, a binary multistage signal element counter means coupled to the output of said gating means, whereby the condition of each stage is dependent upon the number of pulses applied to said counter means, detecting means coupled to the output of said first pulse generator and to predetermined stages of said counter means for detecting the condition thereof upon the occurrence of a finish pulse, whereby the condition of the detected stages is related to the pulse repetition rate of said second pulse generator, and frequency correction means coupled to said second pulse generator and to the output of said condition detecting means for increasing or decreasing the pulse repetition rate of said second pulse generator if the condition of said stages indicates a deviation from said predetermined pulse repetition rate.

2. In a Morse code-to-binary code converter as defined in claim 1, in which said detecting means includes a plurality of circuit means, each circuit means being coupled to a predetermined number of said stages, each circuit means producing a control signal depending upon the condition of the predetermined number of said stages said frequency correction means being responsive to the control signal produced by any of said circuit means.

3. In a Morse code-to-binary code converter as defined in claim 1, in which said detecting means includes a first plurality of circuit means, each of said circuit means being coupled to a predetermined number of stages, one of said circuit means producing a control signal when the condition of the predetermined stages to which it is coupled is that the pulse repetition rate is below the desired rate, a second plurality of circuit means, each of said second plurality of circuit means being coupled to a predetermined number of stages, one of said second circuit means producing a control signal when the condition of the predetermined stage to which it is coupled is that the pulse repetition rate is below the desired rate, and said frequency correction means being responsive to the control signal produced by said first plurality of circuit means or said second plurality of circuit means.

4. In a Morse code-to-binary code converter as defined in claim 3, in which said detecting means includes a third circuit means coupled to each of said stages to determine the presence of any pulses, said third circuit means producing a control signal when stages read zero, and said frequency correction means producing a large correction in response to said control signal from said third circuit means.

5. In a Morse code-to-binary code converter as defined in claim 1, in which said detecting means includes a plurality of AND circuits, said first pulse generator being connected as an input to each AND circuit said stages of said counter being coupled in predetermined groupings as inputs to predetermined AND circuits, whereby one of said AND circuits will produce an output control signal if the number of pulses counted by said stages are not equal to the predetermined pulse repetition rate of said second pulse generating means, and said frequency correction means includes a plurality of correction pulse producing means coupled to said AND circuits respectively and responsive to an output control signal and relay control means responsive to said correction pulse producing means for increasing or decreasing said pulse repetition rate.

6. In a Morse code-to-binary code converter, a first pulse generating means for generating start and finish pulses identifying respectively the beginning and end of a Morse signal element a second pulse generator means having a predetermined pulse repetition rate of higher frequency than said start and finish means gating means including AND circuit means coupled to the output of said first and second generating means for passing pulses from said second generating means during the period between said start and finish pulses, whereby said gating means passes a given number of pulses indicative of a dot and a different number of pulses indicative of a dash binary multistage signal element counter means coupled to the output of said gating means, whereby the condition of each stage is dependent upon the number of pulses applied to said counter means detecting means coupled to the output of said first pulse generator and to predetermined stages of said counter means for detecting the condition thereof upon the occurrence of a finish pulse including a plurality of AND circuits and means selectively coupling said AND circuits respectively to a predetermined plurality of said stages whereby the condition of the detected stages and said AND circuits are related to the pulse repetition rate of said second pulse generator, and frequency correction means coupled to and responsive to said detecting means for increasing or decreasing the pulse repetition rate of said second pulse generator if the condition of said stages indicates a deviation from said predetermined pulse repetition rate.

References Cited by the Examiner
UNITED STATES PATENTS
2,919,854   1/60   Singman _____ 340—146.1 XR
2,945,221   7/60   Hinton et al. _____ 178—26 XR
3,038,030   6/62   Murray _____ 178—26.5

NEIL C. READ, Primary Examiner.
MALCOLM A. MORRISON, ROBERT H. ROSE,
Examiners.